INVENTOR
SILAS A. BROWN

United States Patent Office
3,614,822
Patented Oct. 26, 1971

3,614,822
METHOD OF FORMING INTEGRAL MESH SUPPORTING FIXTURES
Silas A. Brown, Lake Elmo, Minn., assignor to Buckbee-Mears Company, St. Paul, Minn.
Filed Mar. 28, 1969, Ser. No. 811,548
Int. Cl. B23p 15/16
U.S. Cl. 29—163.5 R                                          2 Claims

ABSTRACT OF THE DISCLOSURE

A process of electroforming and etching a material to produce an integral supporting fixture comprising the steps of electroforming a layer of depositant onto and into metal mesh, applying etchant resist to the depositant in the shape of the supporting fixture, etching away the excess depositant so as to leave only an integral supporting fixture, removing excess resist, cutting the supporting fixture from the remaining mesh, and crimping the integral supporting fixture so as to tighten the mesh supported therein.

BACKGROUND OF THE INVENTION

Field of the invention

This invention relates generally to the art of producing material supporting fixtures and, more specifically, to producing integral supporting fixtures for mesh or mesh-like material.

Description of the prior art

In the manufacture of certain electronic tubes and filters it is oftentimes necessary to use a very flimsy mesh that varies in porosity from a few lines per inch to thousands of lines per inch. Typically, this mesh is less than $4/1000$ of an inch in thickness. Although this mesh is a metallic material, because of its porosity and thinness it is in fact rather limp and difficult to support. Handling and supporting this mesh creates problems as the mesh tears quite easily. Heretofore, prior art methods of supporting the mesh involved placing the mesh across a support fixture and then spot welding the mesh to the support fixture. This method, while providing a supporting arrangement for the mesh, is disadvantageous because it is difficult to obtain a uniform tightness of the mesh in the supporting fixture as well as obtaining uniform supporting forces on the mesh where the mesh joins the supporting fixture. Consequently, there are regions where the mesh is tightly held to the supporting fixture and regions where the mesh is loosely held to the supporting fixture. With the mesh held unevenly the application of a slight force on the mesh creates a high concentration of stress in the tightly held areas which can exceed the tensile strength of the materials, thus causing the mesh to tear loose from the supporting fixture. Consequently, the prior art mesh supporting fixtures and the mesh had to be handled very carefully to avoid rupturing of the mesh from the support fixture.

In order to eliminate the disadvantages associated with welded mesh supporting fixtures, the present invention provides an integral mesh supporting fixture which eliminates regions of uneven stress between the material and the supporting fixture due to localized attachment found in prior art methods such as found in spot welding.

SUMMARY OF THE INVENTION

Briefly, the present invention comprises a process for forming an integral mesh supporting fixture by electroforming material on the mesh, then defining a fixture support area on the electroformed material in etchant resist and then etching to remove the material not covered by etchant resist thereby leaving an electroformed supporting fixture.

DESCRIPTION OF THE PREFERRED METHOD

Briefly, in the first step a sheet of mesh 10, such as stainless steel or nickel mesh, is stretched tight and then a layer of depositant 11 is electroformed onto both sides of mesh 10. The electroformed layer of depositant 11 can be any suitable material as long as it is a different material than the material mesh 10 is made from. The reason for using a different layer of depositant than the mesh material will become apparent in the latter steps when a suitable etchant is applied to a portion of the layer of depositant 11 to etch away the depositant 11 without harming or removing the mesh material. As the process of electroforming and etching are well known in the art they will not be described herein.

One can electroform depositant 11 onto mesh 10 until it only covers the exposed portions of the mesh or until the holes in the mesh are completely filled. In either event, electroforming the layers of depositant 11 on the mesh produces a sheet of mesh that is integrally formed with the layer of depositant 11.

There are two methods of forming the supporting fixture for the mesh. One involves electroforming a layer of depositant onto the mesh until it has sufficient rigidity to act as a supporting fixture and the other method is to electroform a first protective coating material on the mesh and then electroforming a second thicker layer of depositant over the protective coating to act as a supporting fixture. Either method produces an integral mesh supporting fixture. However, by using the latter method one can form the supporting fixture from the same material as the mesh, which may be advantageous in certain applications.

If the latter method of forming supporting fixtures is used, the first layer of depositant should be material which is resistant to most etchants such as gold. However, it is not necessary that gold be used as other materials could be used as long as there are different etchants that will not react to both the mesh and the layer of depositant. This will become more apparent in later steps of the method where depositant 11 is removed in certain selective areas. The second layer of depositant can be nickel, or, as previously mentioned, the same material as the mesh is made from. The purpose of the second layer of depositant is to eventually act as the support fixture for the mesh.

Figure 1:
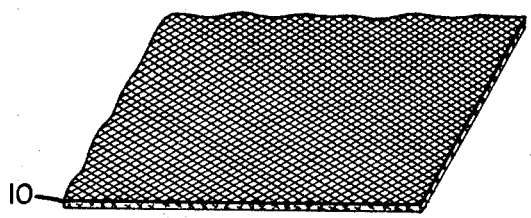
FIGS. 1 to 8 illustrate the various steps in forming the integral mesh-supporting fixture.
Figure 2:
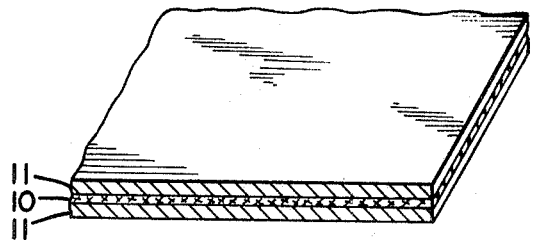

The first method employing a single layer of depositant on the mesh will now be described in more detail. Referring to FIG. 2, an operator has electroformed a layer of depositant 11 onto both sides of mesh material 10. The layer of depositant 11 can be any suitable material, however, as the layer of depositant will eventually form the support fixture for the mesh 10, it should be a material that is different from mesh material 10. This will allow an operator to use an appropriate etching material to selectively remove the layer of depositant 11 without harming material 10.

Figure 3:
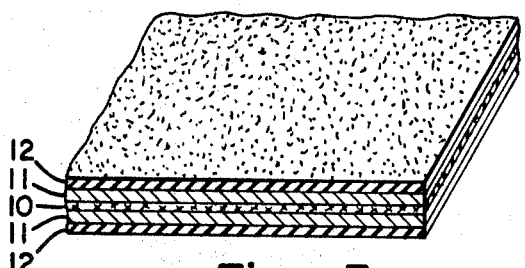
Figure 4:
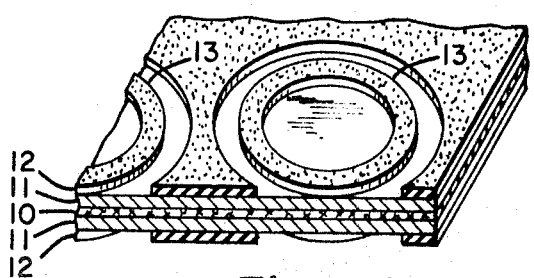

In the next step (FIG. 3), an operator applies a layer of etchant resist 12 over a layer of depositant 11. Next (FIG. 4) an operator forms a supporting fixture outline 13 in etchant resist 12. This defines the area that will become a supporting fixture for mesh material 10 and also the waste areas between the supporting fixtures.

Figure 5:
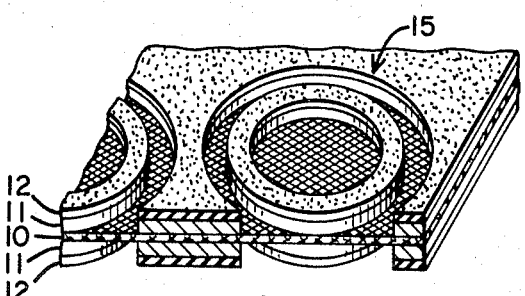

In the next step (FIG. 5), an operator sprays etchant on exposed portions of the layer depositant 11 thus etching away any depositant 11 not covered by etchant resist 12. This produces a ring-like supporting fixture 15 integrally formed to mesh 10 and depositant 11. Also, by selectively removing depositant 11 with a suitable etchant, it restores the mesh 10 within the central area of the supporting fixture 15 and the annular portion of the mesh outside of the supporting fixture 15 to its original unelectroformed condition.

Figure 6:
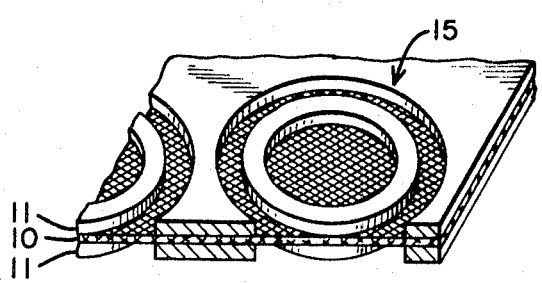

Next (FIG. 6) the electroformed mesh is placed in a solution to dissolve the exposed layer of etchant resist 12 without affecting mesh 10.

Figure 8:
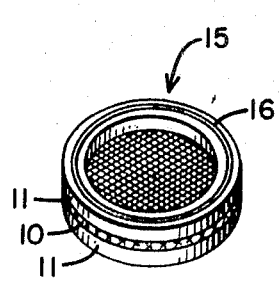

In order for an operator to remove supporting fixture 15 from the mesh around the supporting fixture, he merely cuts around the annular portion of the mesh located outside supporting fixture 15. This separates or frees supporting fixture 15 (FIG. 8) from the adjacent supporting fixture formed on the mesh.

Figure 7:
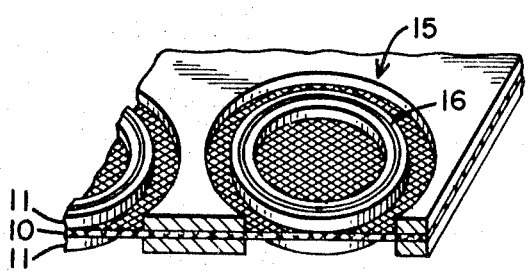

However, prior to removing the ring supporting fixture or after removing the ring supporting fixture from the sheet, an operator can crimp the ring supporting fixture to ensure that the fixture holds the mesh material in a taut condition. The purpose of the crimp (FIG. 7) indicated by reference numeral 16, is to uniformly and radially expand the supporting fixture to produce a uniform tension throughout the mesh. Because the mesh is integrally formed with the supporting fixture 15, an operator can force an annular V-shaped member into supporting fixture 15 so as to radially expand the supporting fixture to thereby produce a taut mesh located therein. As the mesh is uniformly held by the supporting fixture, radial expansion of supporting fixture does not produce areas of high stress concentration which would readily break such as in the prior art spot welding type of holding fixtures.

I claim:

1. The method of forming an integral peripheral supporting fixture for metal mesh material comprising the steps of:
   (a) electroforming a layer of depositant on both sides of the metal mesh so as to form an integral rigid structure therewith of a thickness substantially greater than that of the mesh;
   (b) applying a layer of etchant resist to both sides of said integral structure;
   (c) removing part of said etchant resist from both sides of said integral structure so as to leave similar resist covered areas on both sides in the shape of the desired peripheral supporting fixture;
   (d) etching said depositant away on the portions of the integral structure not covered with resist so as to leave only said peripheral supporting fixture with the mesh supported therein;
   (e) removing the remaining resist from said depositant layer;
   (f) cutting about said peripheral supporting fixture to separate said mesh supporting peripheral fixture from the rest of the metal mesh material; and
   (g) crimping the peripheral supporting fixture to thereby radially expand the fixture and tighten the metal mesh within the fixture.

2. The method of claim 1 wherein a second layer of depositant is electroformed on top of the first layer of depositant on said sheet of mesh before etching.

References Cited

UNITED STATES PATENTS

| | | | |
|---|---|---|---|
| 2,288,020 | 6/1942 | Noland et al. | 156—3 X |
| 2,338,091 | 1/1944 | Brennan et al. | 156—3 X |
| 3,130,487 | 4/1964 | Mears | 29—163.5 X |
| 3,215,563 | 11/1965 | Clemm | 204—15 X |

FOREIGN PATENTS

| | | | |
|---|---|---|---|
| 419,110 | 10/1925 | Germany | 156—3 |

JOHN F. CAMPBELL, Primary Examiner

V. A. DIPALMA, Assistant Examiner

U.S. Cl. X.R.

29—163.5 F; 156—3, 11; 204—15, 16